US011069214B2

(12) United States Patent
Souloglou

(10) Patent No.: US 11,069,214 B2
(45) Date of Patent: Jul. 20, 2021

(54) EVENT ENTITY MONITORING NETWORK AND METHOD

(71) Applicant: Seechange Technologies Limited, Cambridge (GB)

(72) Inventor: Jason Souloglou, Macclesfield (GB)

(73) Assignee: Seechange Technologies Limited, Cambridge (GB)

(*) Notice: Subject to any disclaimer, the term of this patent is extended or adjusted under 35 U.S.C. 154(b) by 0 days.

(21) Appl. No.: 16/502,465

(22) Filed: Jul. 3, 2019

(65) Prior Publication Data
US 2020/0013273 A1   Jan. 9, 2020

(30) Foreign Application Priority Data
Jul. 4, 2018 (GB) .................................... 1810971

(51) Int. Cl.
*G08B 21/18* (2006.01)
*G06K 9/00* (2006.01)
(Continued)

(52) U.S. Cl.
CPC ............ *G08B 21/18* (2013.01); *G06F 16/56* (2019.01); *G06F 16/58* (2019.01);
(Continued)

(58) Field of Classification Search
CPC ......... G08B 21/18; G06F 16/58; G06F 16/56; G06K 9/00718; G06K 9/00771;
(Continued)

(56) References Cited

U.S. PATENT DOCUMENTS 6,525,658 B2 * 2/2003 Streetman ............ G08B 29/186
340/506
6,975,346 B2 * 12/2005 Kumhyr ............ G06K 9/00288
348/143
(Continued)

FOREIGN PATENT DOCUMENTS

| EP | 2 722 636 | 4/2014 |
|---|---|---|
| WO | 2007/030168 | 3/2007 |
| WO | 2007/081629 | 7/2007 |

OTHER PUBLICATIONS

Combined Search and Examination Report for GB1810971.0 dated Dec. 20, 2018, 9 pages.
(Continued)

*Primary Examiner* — Adnan Aziz
(74) *Attorney, Agent, or Firm* — Nixon & Vanderhye P.C.

(57) ABSTRACT

A method of monitoring for the presence of an event entity in a monitored region comprising receiving, at a first level of detail, first event data from at least one data processing device of a plurality of data processing devices each configured to monitor at least a portion of a monitored region, the first event data indicative of an event entity occurring in the monitored region; processing the first event data to determine the presence of an event entity indicated by the event data; comparing the identified event entity with a data store defining notification events; and responsive to the identified event entity matching a notification event, outputting a notification relating to the identified event entity.

21 Claims, 3 Drawing Sheets

(51) Int. Cl.
  *G06F 16/56* (2019.01)
  *G06F 16/58* (2019.01)
  *H04L 29/08* (2006.01)

(52) U.S. Cl.
  CPC ..... *G06K 9/00718* (2013.01); *G06K 9/00771* (2013.01); *G06K 2009/00738* (2013.01); *H04L 67/12* (2013.01)

(58) Field of Classification Search
  CPC ......... G06K 2009/00738; G06Q 10/00; G06Q 50/265; H04L 67/12; H04W 4/38
  See application file for complete search history.

(56) References Cited

U.S. PATENT DOCUMENTS

| | | | | |
|---|---|---|---|---|
| 7,382,244 | B1* | 6/2008 | Donovan | G08B 13/19656 340/506 |
| 7,440,594 | B2* | 10/2008 | Takenaka | G06K 9/00221 382/118 |
| 7,868,912 | B2* | 1/2011 | Venetianer | G08B 13/19673 348/143 |
| 9,934,625 | B1 | 4/2018 | Wahba et al. | |
| 10,380,429 | B2* | 8/2019 | Chaudhry | G06K 9/00771 |
| 2004/0143602 | A1* | 7/2004 | Ruiz | H04N 7/181 |
| 2012/0219271 | A1* | 8/2012 | Vunic | G06K 9/00765 386/278 |
| 2014/0140575 | A1* | 5/2014 | Wolf | G06K 9/00771 382/103 |
| 2014/0333775 | A1* | 11/2014 | Naikal | G06K 9/00711 348/159 |
| 2015/0156100 | A1 | 6/2015 | Skaaksrud | |
| 2015/0163121 | A1* | 6/2015 | Mahaffey | H04L 63/1425 707/687 |
| 2015/0220777 | A1* | 8/2015 | Kauffmann | H04N 5/2621 382/103 |
| 2016/0240055 | A1 | 8/2016 | Donovan et al. | |
| 2016/0283745 | A1* | 9/2016 | LaFever | G06F 21/6254 |
| 2016/0322078 | A1* | 11/2016 | Bose | A63F 13/217 |
| 2017/0078767 | A1* | 3/2017 | Borel | G06K 9/00758 |
| 2017/0195166 | A1* | 7/2017 | Keerthi | H04L 67/16 |
| 2018/0053394 | A1* | 2/2018 | Gersten | H04N 5/91 |

OTHER PUBLICATIONS

Office Action for GB Application No. 1810971.0 dated Nov. 18, 2020, 6 pages.
Examination Report for GB Application No. 1810971.0 dated Jun. 3, 2021, 3 pages.

\* cited by examiner

EVENT ENTITY MONITORING NETWORK AND METHOD

This application claims priority to GB Patent Application No. 1810971.0 filed Jul. 4, 2018, the entire content of which is hereby incorporated by reference.

The present technology relates to a network and a method of monitoring for the presence of an event entity. Such monitoring enables scenario recognition and can result in a wide set of actions being implemented by a system in response to the monitoring. Such actions may be an alert, alarm or a security response, a change of infrastructure, course correction, behaviour modification of machines or logging events, recording evidence.

The present technology also provides for analysis of event entities at various levels of abstraction. Such abstraction can speed up recognition algorithms used in scenario recognition and provide improved security through anonymity of data.

The present technology also provides an option for varying the level of abstraction of data provided to a remote user dependent upon predetermined criteria or automatic, on-the-fly based variation. Present techniques have particular application in physical and electronic security networks of electronic devices. In such a case the system may implement an action of encryption of data or adaptive resolution sampling of the event entity depending upon user protocols.

Scenario recognition is a process of identifying event entities in context. Event entities may be determined from gathering event data from a wide range of monitoring sources. For example, identification of a football with people (event data) in an environment such as a stadium (further event data) leads to a high probability that a football match is occurring and that the scenario is one of a group of people playing football. Within the football match event entity there are many event entities that can be monitored and/or inferred from event data. These other event entities may be a dropped ball, dangerous play, a tackle, a fire or a crowd disturbance.

Present techniques provide a scenario recognition service for integration into an Internet of Things (IoT) networked environment. More and more data processing devices are being connected together, often via the cloud, as part of the Internet of Things (IoT). Such devices may be embedded IoT devices, including image sensors, sound sensors, brightness sensors, odour sensors, temperature sensors, humidity sensors and proximity sensors, fitness trackers, PIR motion detectors and mobile (cell) phones. Applied to the above example of the football match event, an IoT temperature sensor may indicate a high ambient temperature and so the scenario may be more accurately described as one of people playing football during a hot day.

According to a first technique, there is provided a method of monitoring for the presence of an event entity in a monitored region comprising receiving, at a first level of detail, first event data from at least one data processing device of a plurality of data processing devices each configured to monitor at least a portion of a monitored region, the first event data indicative of an event entity occurring in the monitored region; processing the first event data to determine the presence of an event entity indicated by the event data; comparing the identified event entity with a data store defining notification events; and responsive to the identified event entity matching a notification event, outputting a notification relating to the identified event entity.

Present techniques provide a method that delivers both security, scalability and efficiencies needed for mass adoption, especially with constrained communication and IoT communication protocols.

Embodiments will now be described, with reference to the accompanying drawings of which:

Figure 1:
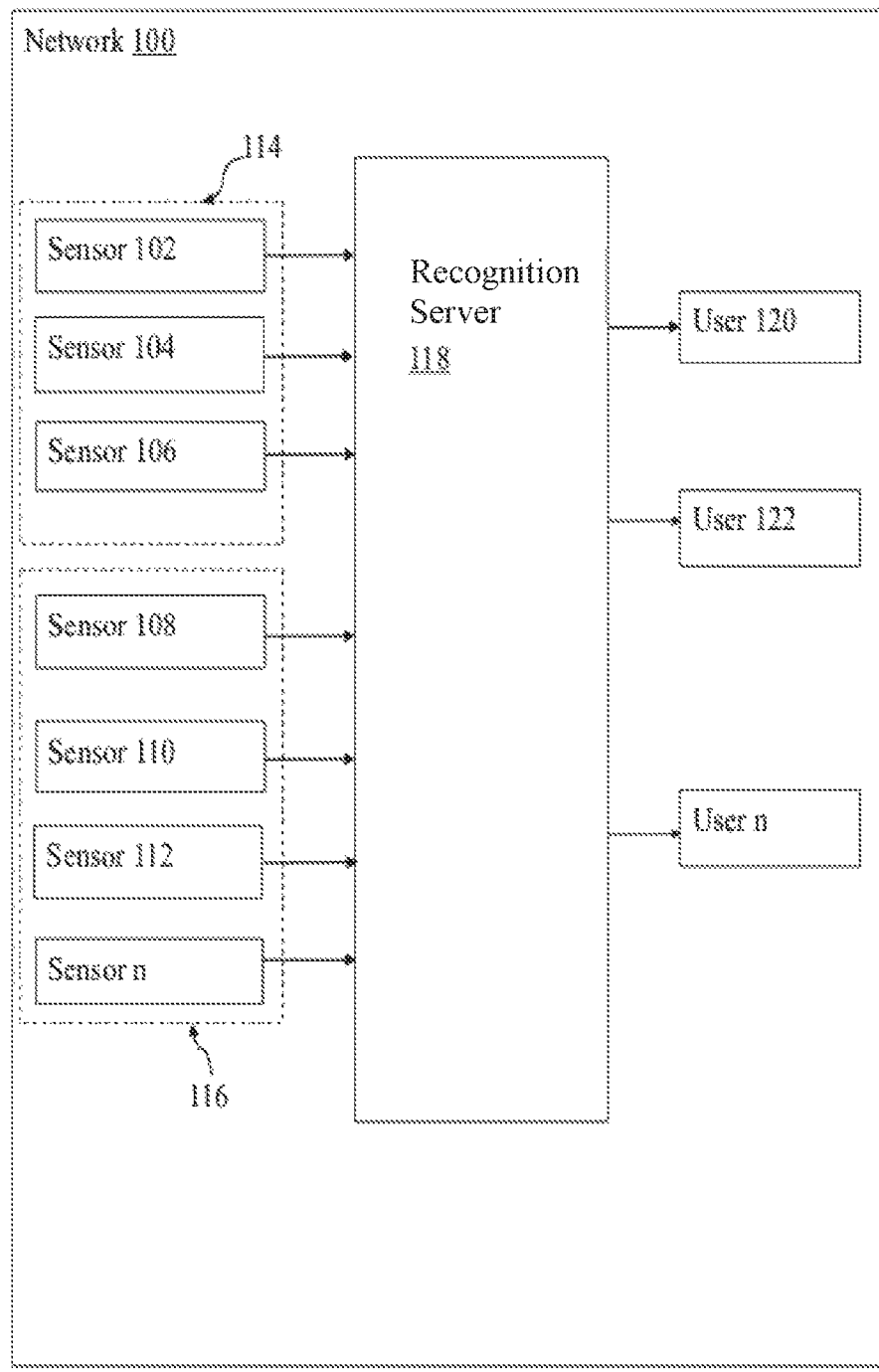
FIG. 1 is a schematic diagram of a scenario recognition network according to presently described technology.

Scenario recognition systems process images in order to gain information about the real world. Such a recognition system is required to acquire, process, analyse and understand digital images in order to extract data from the digital images. The recognition system normally comprises one or more image acquisition devices, such as cameras, for obtaining the digital images.

In order to "understand" a digital image, such a recognition system is required to detect features and objects within the image, for example by detecting lines, edges, ridges, corners, blobs, textures, shapes, gradients, regions, boundaries, surfaces, volumes, colours and shadings. The detected features are used to understand the image the recognition system is looking at, such as the size and shape of the scenario, as well as identify different objects within the scenario and the geometry and orientation of those objects.

Recognition systems are designed to extract high-level symbolic information from raw image or video data, that can be used by a software program to accomplish some task. Examples of high-level information include spatial models of the scenario, lists of objects in the scenario, identifications of unique objects in a scenario, tracking of objects though a space, estimation of the motion of objects in a scenario, detection of events in a scenario, recognition of gestures. Common applications of this information include indexing, user interfaces, surveillance, augmented reality, text recognition, process control, inspection/diagnosis, navigation.

Recognition can be accomplished using a variety of methods. Tasks requiring object recognition are usually solved by some variation on a process of comparing stored representations of objects of interest to elements in the scenario then applying some rule for determining a match. Many recognition systems therefore rely on a proprietary data store of pre-specified objects when trying to identify a detected object. For example, a recognition system may group a set of features as a candidate object in the scenario and then refers to the data store of pre-specified objects in order to identify the detected object. The proprietary data store, sometimes called a modelbase, of pre-specified objects, sometimes called templates, is associated with the recognition system and comprises a plurality of images of different objects.

In a first technique, a method of monitoring an event entity comprises receiving, at a first level of detail, first event data from a plurality of data processing devices in a monitored region; processing the first event data to identify the event entity inferred by the event data; comparing the identified event entity with a data store defining notification events; and responsive to the identified event entity matching a notification event, outputting a notification.

In embodiments, the sensing system comprises sensors such as a camera, drone, autonomous vehicle or many forms of IoT sensor (light, smell, temperature, sound etc) which can extract data of image size, orientation, type, ID and tracking in real time, and process that data using AI/ML at the edge, then send a compressed output to the cloud. The event entity inferred by the event data may be considered as a local inference or determination that is in fact smaller in data size than the original raw data. So, the data output by a sensor may be anonymised data or a notification, but also in embodiments may be a coarse inference (i.e. by some Machine Learning classification process) relating to an event that has occurred.

Therefore, present techniques may go further than compressing raw information and may empower devices to make some local inference about the sensed environment, for example where there is a desire to reach a quick, coarse first determination. Notification may be an output from a classifier that is attempting to determine whether an event occurs and therefore using machine learning of data sets not just for compression, but also to allow determination and interrogation of an event entity to determine whether the event occurs or not.

Accordingly, in techniques a compressed data output may be anonymised data, a notification, metadata at varying levels of abstraction. In examples, only the notification leaves the edge, the data can stay encrypted locally. The event entity therefore may be represented in embodiments as a compression of the raw information data which is sensed by the sensing system. The data transmitted from the local sensor is at a level of detail which is lower than the raw level of detail being actively sensed.

An edge sensor may be configured to implement a Machine Learning Algorithm (MLA) and may also carry out various methods in order to train the MLA. In some embodiments, the MLA may be one of: an artificial neural network, a Bayesian network or a support vector machine. In another embodiment, the MLA may be a prediction model that consists of an ensemble of decision trees for solving inter alia regression and classification problems. Different algorithms may be used for generating notifications for varying policies at different levels of abstraction. Natural language processing may be used in combination with image analysis for example, also at different levels of abstraction.

In embodiments, the first level of detail of first event data comprises metadata describing properties of the event entity. The metadata may be a message to state that an event has occurred, for example, according to a predefined list of possible events and associated messages. The message may be time and date stamped, for example, and include a geolocation tag. In such a case, the event entity is identified based upon the metadata. In cases, a predetermined course of action is made based upon the metadata.

In embodiments, in response to the event entity matching a notification event, requesting at a second level of detail second event data, wherein the second level of detail is more detailed than the first level of detail, and outputting a notification comprising the event data having the second level of detail. In such a case, outputting a notification comprises the event data having the second level of detail comprises a notification to a data processing device having authorisation to access the event data having the second level of detail.

The event data may take many forms. For example, the event data may identify a movement of the event entity, an image of the event entity, a sound of the event entity, a common grouping or class of related event entities or a proximity value between event entities, the proximity value being a pre-defined distance between monitored event entities.

Embodiments include communicating the event data to a recognition server. The recognition server may perform vector form extraction on the event data to provide the first level of detail. In such a case, the first level of detail is a vector image representative of the event data.

The recognition server may comprise a scenario identifier in communication with a decision module for determining a course of action associated with the notification.

The recognition server may also include a scenario identifier in communication with a vector event data store, a vector scenario data store and a vector environment data store for comparing the vector image with one or more of the data stores.

Embodiments may include a predictive event generator module for analysing the scenario identifier and making a prediction on a likely outcome of a future event. Such a generator may use machine learning and artificial intelligence computing algorithms.

Event data is typically obtained from a plurality of sensors and may in embodiments be fed to the data processing devices from a database of existing or historical data. Sensors include at least one of embedded IoT devices, image sensors, sound sensors, brightness sensors, odour sensors, temperature sensors, humidity sensors and proximity sensors, fitness trackers, PIR motion detectors and mobile (cell) phones.

In embodiments, outputting a notification includes implementing a predetermined course of action. In such a case, the predetermined course of action is an alert, alarm, security response or tracking the event entity.

Present techniques also provide a monitoring data processing device comprising a sensor for monitoring an event entity in a monitored region and a data processor for generating first event data at a first level of detail used to identify the event entity; and an output module for communicating the first event data to a recognition server. In such a case, the first level of detail is metadata describing properties of the event entity, and in embodiments the event entity is identified based upon the metadata.

The data processing device may also comprise a comparator and a data store defining notification events; and responsive to the identified event entity matching a notification event, outputting a notification. In such a case, the device may receive a request from a remote server to monitor an event entity at a second level of detail based on second event data, wherein the second level of detail is more detailed than the first level of detail, and outputting a notification comprising the event data having the second level of detail.

Present techniques also provide a recognition server comprising input circuitry for receiving, at a first level of detail, first event data from a plurality of data processing devices in a monitored region; a processor for processing the first event data to identify the event entity inferred by the event data; a comparator for comparing the identified event entity with a data store defining notification events; and responsive to the identified event entity matching a notification event, an output for outputting a notification. In embodiments, the first level of detail of first event data is metadata describing properties of the event entity and the event entity may be identified based upon the metadata.

Present techniques also provide a network for monitoring an event entity comprising a plurality of data processing devices comprising sensors for monitoring event entities in a monitored region and a data processor for generating first event data at a first level of detail used to identify the event entity; and an output module for communicating the first event data to a recognition server; the recognition server comprising input circuitry for receiving, at a first level of detail, first event data from the plurality of data processing devices; a processor for processing the first event data; a comparator for comparing the identified event entity with a data store defining notification events; and responsive to the identified event entity matching a notification event, an output for outputting a notification.

FIG. 1 is a schematic diagram of a scenario recognition network 100 according to presently described technology. Referring to FIG. 1, the network 100 comprises many hundreds or thousands of sensors 102, 104, 106, 108, 110, 112—sensor n, that identify and capture objects. Objects are as examples a person, car, fire, alarm, dog, cat and ship from an environment 114, 116. A recognition server 118 in communication with the sensors 102—sensor n identifies scenarios or situations occurring in the environment 114, 116 based upon data from the one or more sensors 102—sensor n capturing data from the environment 114, 116. Within the recognition server 118, the data is processed and raw data may be abstracted to objects locally and objects to a scenario within the network 100, for example to generate from observed objects and via a scenario processing engine (shown in FIG. 2) an abstracted summary of the environment. As an output of the recognition server 118, the abstracted scenario may be made available to a variety of users 120, 122 to user n.

Figure 2:
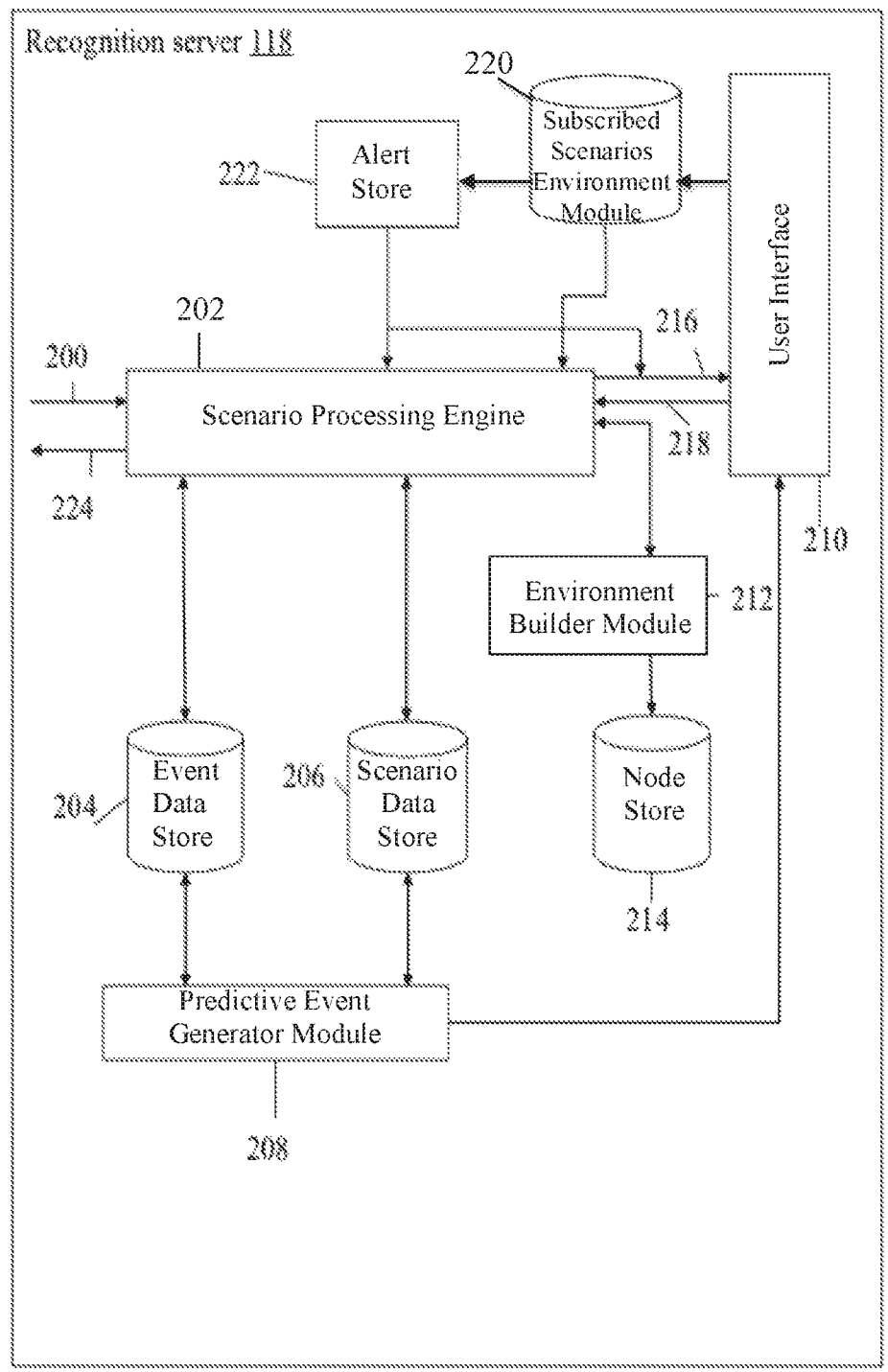
FIG. 2 is a schematic diagram of a recognition server forming part of a scenario recognition network according to presently described technology.

FIG. 2 is a schematic diagram of the recognition server 118 forming part of the scenario recognition network 100 as shown in FIG. 1 according to presently described technology. Referring to FIG. 2, sensor data 200, which may be at the object level or raw data level depending upon the configuration and nature of the network 100 and sensors 100-n is communicated to a scenario processing engine 202. The scenario processing engine 202 is connected to an event data store 204 and a scenario data store 206, which are both connected to a predictive event generator module 208. The predictive event generator module is connected to a user interface 210. The scenario processing engine is further connected to an environment builder module 212, which is connected to an environment or node store 214.

The scenario processing engine 202 has a notify 216 and request 218 data communication streams connected to the user interface 210. The user interface 210 is connected to a subscribed scenarios environment module 220 which is connected both directly to the scenario processing engine 202 and connected to the scenario processing engine 202 by way of an alert store 222. In, embodiments, the alert store 222 may be in direct communication with the notify communication data stream 216. In embodiments, the scenario processing engine 202 may request sensor data 200 from a request communication data channel 224.

In operation, the sensor data 200 is received into the scenario processing engine 202 which processes the data and determines objects and scenarios based on a data set which may be learnt or provided. The environment builder module 212 allows sensors 102, 104, 106 to be a geographically bound space in an environment 114 such that associations can be made between sensors 102, 104, 106 to allow scenario data to be generated. The environment 114 may not be geographically bound, in embodiments the environment 114 may be "my family" or "my fleet of vehicles". The subscribed scenarios environment module 220 allows a user via the user interface 210 to define or choose various environments to subscribe and/or select triggers of scenarios detection within those environments. Such environments may be a car accident, assault or fire, for example.

The predictive event generator module 208 is connected to the event data store 204 and the scenario data store 206. In the scenario where a particular sequence of events or a particular scenario is identified, the predictive event generator module can make a determination that a scenario outcome has a high probability of occurring. Accordingly, the predictive event generator module 208 can communication to a user through the user interface 210 that a particular event is about to occur.

In, for example, a specific, but non-limiting, case of monitoring a public space, by default and to retain privacy, cameras with object recognition technology can detect the behaviour of individuals. Such an object recognition technology is provided by Arm's™ Object Detection Processor, which provides images of people, including the direction they are facing, their movement, pose and even identity. This is in real time on scenarios of up to 4K resolution. The digital data representing the people can then be sent for further analysis up stream, either for local processing or to cloud-based services. The core includes advanced technology for reducing false positive detection.

In embodiments, a level of abstraction to the data can be provided to the data obtained by technology such as Arm's™ Object Detector Processor. Abstraction can be provided by vector image analysis and can be used to identify and anonymise people without ever communicating anything identifying an individual. Scenarios may be communicated as "outside space, people walking"; a security service may be alerted in the event a scenario is triggered of a person attacking another; or an alarm going off in a building.

Applying a level of abstraction to the data such as can be provided by vector image analysis results in smaller data sets enabling faster processing and enabling communication between bandwidth constrained, power constrained and processor constrained embedded IoT devices.

For systems processing and monitoring public areas in which security is less of an issue and IoT devices may have access to more processing power, the present techniques provide a model in which limited data is available for general scenario monitoring, whereas more detailed data aggregation and visibility can be provided upon request from a user. In embodiments, the system may automatically determine the environment and context from the data obtained at a first level of abstraction and detail and automatically and dynamically modify the level of abstraction and detail for subsequent data.

A recognition network 100 according to present techniques allows for varying degrees of abstraction for different environment and users on the same data simultaneously. For example, for a home alarm monitoring system, residents of a neighbourhood can sign up to alert events in neighbouring properties and access full details on their own property.

EXAMPLE 1

Environment=home
Sensor 102, 104, 106=PIR sensors
Sensor 108, 110, 112=cameras
Sensors n=smoke alarms
Sensors n+1=temperature sensor
Sensors n+2=door locks
Identifiable objects=people (PIR/camera), animals, fire (via smoke alarm, camera, temperature sensor)
Communicated Scenarios=no fire; fire, no-one home, fire—residents in property; fire—persons located in room; unknown person in property
Remote service—remote fire monitoring service that automatically triggers an emergency response in the event of a fire, prioritising based on risk to life at the property.

Figure 3:
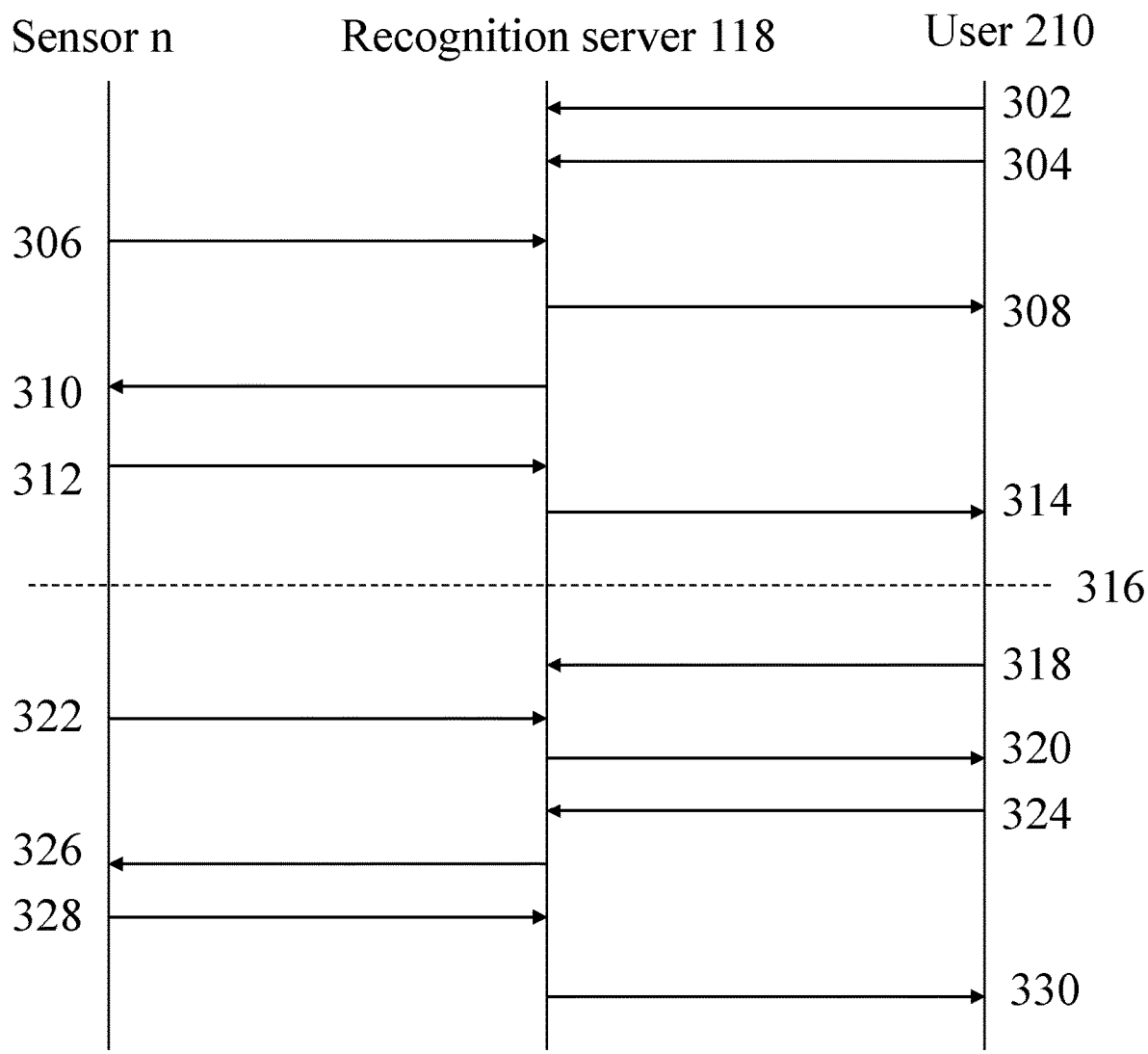
FIG. 3 is a flow diagram of a communications method according to presently described technology.

FIG. 3 is a flow diagram of a communications method 300 according to presently described technology. For brevity, authentication steps are not shown. Referring to FIG. 3, user 210 or application subscriber makes a subscription request 302 to the recognition server 116 whilst also defining alerts 304. In time, event data is provided 306 from sensor n to the recognition server 118 which communicates scenario data 308 to the user 210. An alert event or de-abstraction request 310 may be called to the sensor n and more data at a different level of abstraction is communicated 310 to the recognition server 118 for passing through 314 to the user 210.

In an alternative embodiment, a user 210 can define alerts locally 316. A user 210 makes a subscription request 318 and the recognition server 118 defines the alerts 320. The sensor n provides 322 event data to the recognition server 118 and the user 210 communicates an alert scenario 324 to the recognition server 118, which communicates the alert scenario 324 as a request 326 to the sensor n, which upon the alert scenario 324 being matched returns data 328 to the recognition server 118, which in turn communications the data in the form requested 330 to the user 210.

Various use cases are within the scope of present techniques, particularly in consideration of using a recognition system as a cloud service. For example, the system may implement a particular policy in response to identifying an event entity in an image or video stream.

One example of such a system is where a camera(s) is provided in an operating theatre to track surgical instruments, whereby when the system recognises that an instrument is knocked off a trolley (i.e. the event entity), the policy may be to start recording images, so that if something adverse happens to the patient then the recording can provide evidence of the event; or the policy might be to notify a party that a replacement instrument is required; or to warn the surgical team not to use the instrument.

A policy can be automatic in the sense that it is based upon predetermined criteria and dynamic in the sense that if the system, for example, recognises a child in a changing room, it automatically and dynamically sets its policy to the highest level of abstraction and privacy. If the system recognises an adult falling over in a public place, the system may set the policy to the lowest level of abstraction and lowest level of privacy.

Other examples include checking connections to instruments such as fuel pipe delivery systems and if the fuel pipe becomes disconnected during fuelling then sounding an alert. Monitoring may include proximity detection where the distance between a baby and a guardian is monitored and tracked with the notification being an alarm if the distance exceeds a predetermined amount.

A further example is where the camera might track the number of swabs used on a patient and recognise that a swab is missing at the end of an operation (i.e. the event), and the policy might be to notify the surgical team that the swab is missing. A further example, was the system might detect when a child is being abused and the policy is to notify police.

Present techniques may be described in the following clauses:

Clause 1: A method of monitoring for the presence of an event entity in a monitored region comprising receiving, at a first level of detail, first event data from at least one data processing device of a plurality of data processing devices each configured to monitor at least a portion of a monitored region, the first event data indicative of an event entity occurring in the monitored region; processing the first event data to determine the presence of an event entity indicated by the event data; comparing the identified event entity with a data store defining notification events; and responsive to the identified event entity matching a notification event, outputting a notification relating to the identified event entity.

Clause 2: A method as claimed in clause 1, wherein the first level of detail of first event data comprises metadata describing properties of the event entity.

Clause 3: A method as claimed in clause 2, wherein the event entity is identified based upon the metadata.

Clause 4: A method as claimed in clause 1, including requesting at a second level of detail second event data, wherein the second level of detail is more detailed than the first level of detail, and outputting a notification comprising the event data having the second level of detail; optionally wherein the second level of detail is requested in response to the event entity matching a notification event.

Clause 5: A method as claimed in clause 4, wherein outputting a notification comprising the event data having the second level of detail comprises a notification to a data processing device having authorisation to access the event data having the second level of detail.

Clause 6: A method as claimed in clause 1, wherein the event data identifies a movement of the event entity.

Clause 7: A method as claimed in clause 1, wherein the event data identifies an image of the event entity.

Clause 8: A method as claimed clause 1, wherein the event data identifies a sound of the event entity.

Clause 09: A method as claimed in clause 1, wherein the event data identifies a common grouping or class of related event entities.

Clause 10: A method as claimed in clause 1, wherein the event data identifies a proximity value between event entities, the proximity value being a pre-defined distance between monitored event entities.

Clause 11: A method as claimed in clause 1, including communicating the event data to a recognition server.

Clause 12: A method as claimed in clause 11, including performing vector form extraction on the event data to provide the first level of detail.

Clause 13: A method as claimed in clause 12, wherein the first level of detail is a vector image representative of the event data.

Clause 14: A method as claimed in clause 11, wherein the recognition server comprises a scenario identifier in communication with a decision module for determining a course of action associated with the notification.

Clause 15: A method as claimed in clause 11, wherein the recognition server comprises a scenario identifier in communication with a vector event data store, a vector scenario data store and a vector environment data store for comparing the vector image with one or more of the data stores.

Clause 16: A method as claimed in clause 14 or 15, including a predictive event generator module for analysing the scenario identifier and making a prediction on a likely outcome of a future event.

Clause 17: A method as claimed in clause 11 to 16, including assessing event data with location data, historical data and/or environmental conditions data.

Clause 18: A method as claimed in clause 1, wherein event data is obtained from a plurality of sensors.

Clause 19: A method as claimed in clause 18, including combining the event data from different devices within the plurality of sensors.

Clause 20: A method as claimed in clause 19, including providing event data at different levels of detail and processing the event data at different levels of detail together.

Clause 21: A method as claimed in clause 18, wherein the sensors include at least one of embedded IoT devices, image sensors, sound sensors, brightness sensors, odour sensors, temperature sensors, humidity sensors and proximity sensors, fitness trackers, PIR motion detectors and mobile (cell) phones.

Clause 22: A method as claimed in clause 1, wherein outputting a notification includes implementing a predetermined course of action.

Clause 23: A method as claimed in clause 22, wherein the predetermined course of action is an alert, alarm, security response or tracking the event entity.

Clause 24: A method as claimed in any preceding clause, including implementing a policy in response to identifying an event entity.

Clause 25: A method as claimed in clause 24, the policy including one or more of: recording images and/or sound, recording at different levels of detail or abstraction than the first level of detail, outputting a notification.

Clause 26: A method as claimed in clause 24 or 25, including automatically implementing the policy based upon predetermined criteria and, optionally, dynamically setting the policy to increase or decrease a level of abstraction.

Clause 27: A monitoring data processing device comprising a sensor for monitoring the presence of an event entity in a monitored region and a data processor for generating first event data at a first level of detail used to identify the event entity; and an output module for communicating the first event data to a recognition server.

Clause 28: A monitoring data processing device as claimed in clause 27, wherein the first level of detail is metadata describing properties of the event entity.

Clause 29: A monitoring data processing device as claimed in clause 28, wherein the event entity is identified based upon the metadata.

Clause 30: A monitoring data processing device as claimed in clause 27 to 29 including a comparator and a data store defining notification events; and responsive to the identified event entity matching a notification event, outputting a notification.

Clause 31: A monitoring data processing device as claimed in clause 27, wherein the device receives a request from a remote server to monitor an event entity at a second level of detail based on second event data, wherein the second level of detail is more detailed than the first level of detail, and outputting a notification comprising the event data having the second level of detail.

Clause 32: A recognition server comprising input circuitry for receiving, at a first level of detail, first event data from a plurality of data processing devices in a monitored region; a processor for processing the first event data to identify the event entity inferred by the event data; a comparator for comparing the identified event entity with a data store defining notification events; and responsive to the identified event entity matching a notification event, an output for outputting a notification.

Clause 33: A recognition server as claimed in clause 32, wherein the first level of detail of first event data is metadata describing properties of the event entity.

Clause 34: A recognition server as claimed in clause 33, wherein the event entity is identified based upon the metadata.

Clause 35: A recognition server as claimed in clause 32, wherein in response to the event entity matching a notification event, requesting at a second level of detail second event data from the data processing devices, wherein the second level of detail is more detailed than the first level of detail, and outputting a notification comprising the event data having the second level of detail.

Clause 36: A recognition server as claimed in clause 32, wherein outputting a notification comprising the event data having the second level of detail comprises a notification to a data processing device having authorisation to access the event data having the second level of detail.

Clause 37: A recognition server as claimed in clause 32, wherein the event data having the second level of detail identifies a movement of the event entity.

Clause 38: A recognition server as claimed in clause 32, wherein the event data having the second level of detail identifies an image of the event entity, the image being of a different resolution to the event data having the first level of detail.

Clause 39: A recognition server as claimed clause 32, wherein the event data having the second level of detail identifies a sound of the event entity.

Clause 40: A network for monitoring an event entity comprising a plurality of data processing devices comprising sensors for monitoring the presence of event entities in a monitored region and a data processor for generating first event data at a first level of detail used to identify the event entity; and an output module for communicating the first event data to a recognition server; the recognition server comprising input circuitry for receiving, at a first level of detail, first event data from the plurality of data processing devices; a processor for processing the first event data; a comparator for comparing the identified event entity with a data store defining notification events; and responsive to the identified event entity matching a notification event, an output for outputting a notification.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. The program code may execute and run entirely or partly on a sensor device, eg. a camera. The remote computer may be connected to the user's computer through any type of network. Code components may be embodied as procedures, methods or the like, and may comprise subcomponents which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A method of monitoring for the presence of an event entity in a monitored region comprising:
    receiving, at a first level of detail, first event data from at least one data processing device of a plurality of data processing devices each configured to monitor at least a portion of a monitored region, the first event data indicative of an event entity occurring in the monitored region, the first event data being an anonymized compression of raw information data collected by said at least one data processing device and communicated from the said at least one data processing device at an anonymized level of information detail lower than the raw level of information detail being actively sensed;
    processing the first event data to determine the presence of an event entity indicated by the event data;
    comparing the identified event entity with a data store defining notification events;
    responsive to the identified event entity matching a notification event, outputting a notification relating to the identified event entity;
    wherein a level of abstraction and/or privacy is applied to the notification, the applied level of abstraction and/or privacy being automatically and dynamically determined by an automatically-implemented policy based on a predetermined criteria; and
    requesting at a second level of detail second event data, wherein the second level of detail is more detailed than the first level of detail; and
    outputting a notification comprising the event data having the second level of detail,
    wherein the second level of detail is requested in response to the event entity matching a notification event.

2. The method as claimed in claim 1, wherein the first level of detail of first event data comprises metadata describing properties of the event entity.

3. The method as claimed in claim 2, wherein the event entity is identified based upon the metadata.

4. The method as claimed in claim 1, wherein outputting a notification comprising the event data having the second level of detail comprises a notification to a data processing device having authorisation to access the event data having the second level of detail.

5. The method as claimed in claim 1, including performing vector form extraction on the event data to provide the first level of detail.

6. The method as claimed in claim 5, wherein the first level of detail is a vector image representative of the event data.

7. The method as claimed in claim 1, including communicating the event data to a recognition server and wherein the recognition server comprises a scenario identifier in communication with a decision module for determining a course of action associated with the notification.

8. The method as claimed in claim 7, wherein the recognition server comprises a scenario identifier in communication with a vector event data store, a vector scenario data store and a vector environment data store for comparing the vector image with one or more of the data stores.

9. The method as claimed in 7, including a predictive event generator module for analysing the scenario identifier and making a prediction on a likely outcome of a future event.

10. The method as claimed in claim 1, including assessing event data with location data, historical data and/or environmental conditions data.

11. The method as claimed in claim 1, including obtaining event data from a plurality of sensors, at least one sensor being one of embedded IoT devices, image sensors, sound sensors, brightness sensors, odour sensors, temperature sensors, humidity sensors and proximity sensors, fitness trackers, PIR motion detectors and mobile (cell) phones.

12. The method as claimed in claim 1, wherein outputting a notification includes implementing a predetermined course of action.

13. The method as claimed in claim 12, wherein the predetermined course of action is an alert, alarm, security response or tracking the event entity.

14. The method as claimed in claim 1, the policy including one or more of: recording images and/or sound, recording at different levels of detail or abstraction than the first level of detail, outputting a notification.

15. A monitoring data processing device to monitor an event entity comprising:
    a sensor to monitor the presence of an event entity in a monitored region;
    a data processor to generate first event data at a first level of detail used to identify the event entity, the first event data being an anonymized compression of raw information data collected by the sensor;
    an output circuit to communicate the first event data from the sensor at a level of anonymized information detail lower than the raw level of information detail being actively sensed to a recognition server;
    a comparator; and
    a data store defining notification events,
    where in response to identifying that the event entity matches a notification event, the data processor is configured to output a notification having a level of abstraction and/or privacy applied, the applied level of abstraction and/or privacy being automatically and dynamically determined by an automatically-implemented policy based on a predetermined criteria; and wherein the monitoring data processing device is operable to receive a request from a remote server to monitor an event entity at a second level of detail based on second event data, wherein the second level of detail is more detailed than the first level of detail.

16. The monitoring data processing device as claimed in claim 15, wherein the first level of detail is metadata describing properties of the event entity.

17. The monitoring data processing device as claimed in claim 16, wherein the event entity is identified based upon the metadata.

18. A recognition server to monitor an event entity comprising:

input circuitry to receive, at a first level of detail, first event data from a plurality of data processing devices in a monitored region, the first event data being an anonymized compression of raw information data collected by at least one data processing device of said plurality of data processing devices and received from said at least one data processing device at an anonymized level of information detail lower than the raw level of information detail being actively sensed;

a processor to process the first event data to identify an event entity inferred by the event data;

a comparator to compare the identified event entity with a data store defining notification events; and responsive to the identified event entity matching a notification event, output circuitry to output a notification having a level of abstraction and/or privacy applied, the applied level of abstraction and/or privacy being automatically and dynamically determined by an automatically-implemented policy based on a predetermined criteria;

responsive to the event entity matching a notification event, following a request, the input circuitry to receive at a second level of detail second event data from the data processing devices, wherein the second level of detail is more detailed than the first level of detail, and outputting a notification comprising the event data having the second level of detail.

19. The recognition server as claimed in claim 18, wherein the first level of detail of first event data is metadata describing properties of the event entity.

20. The recognition server as claimed in claim 19, wherein the event entity is identified based upon the metadata.

21. A network for monitoring an event entity comprising:
a plurality of data processing devices comprising:
sensors to monitor the presence of event entities in a monitored region;
a data processor for generating first event data at a first level of detail used to identify the event entity, the first event data being an anonymized compression of raw information data collected by said at least one data processing device of the plurality of data processing devices; and
an output circuit to communicate the first event data from the said at least one data processing device at an anonymized level of information detail lower than the raw level of information detail being actively sensed to a recognition server;
the recognition server comprising:
input circuitry for receiving, at a first level of detail, first event data from the plurality of data processing devices;
a processor for processing the first event data;
a comparator for comparing the identified event entity with a data store defining notification events; and
an output terminal to output a notification having a level of abstraction and/or privacy applied, the applied level of abstraction and/or privacy being automatically and dynamically determined by an automatically-implemented policy based on a predetermined criteria in response to the identified event entity matching a notification event; wherein,
following a request, the data processor is operable to generate at a second level of detail second event data, wherein the second level of detail is more detailed than the first level of detail, and the output circuit is operable to output a notification comprising the event data having the second level of detail.

* * * * *